Jan. 21, 1964 L. A. HARVEY 3,118,250
FLOWER BOX
Filed Nov. 27, 1962
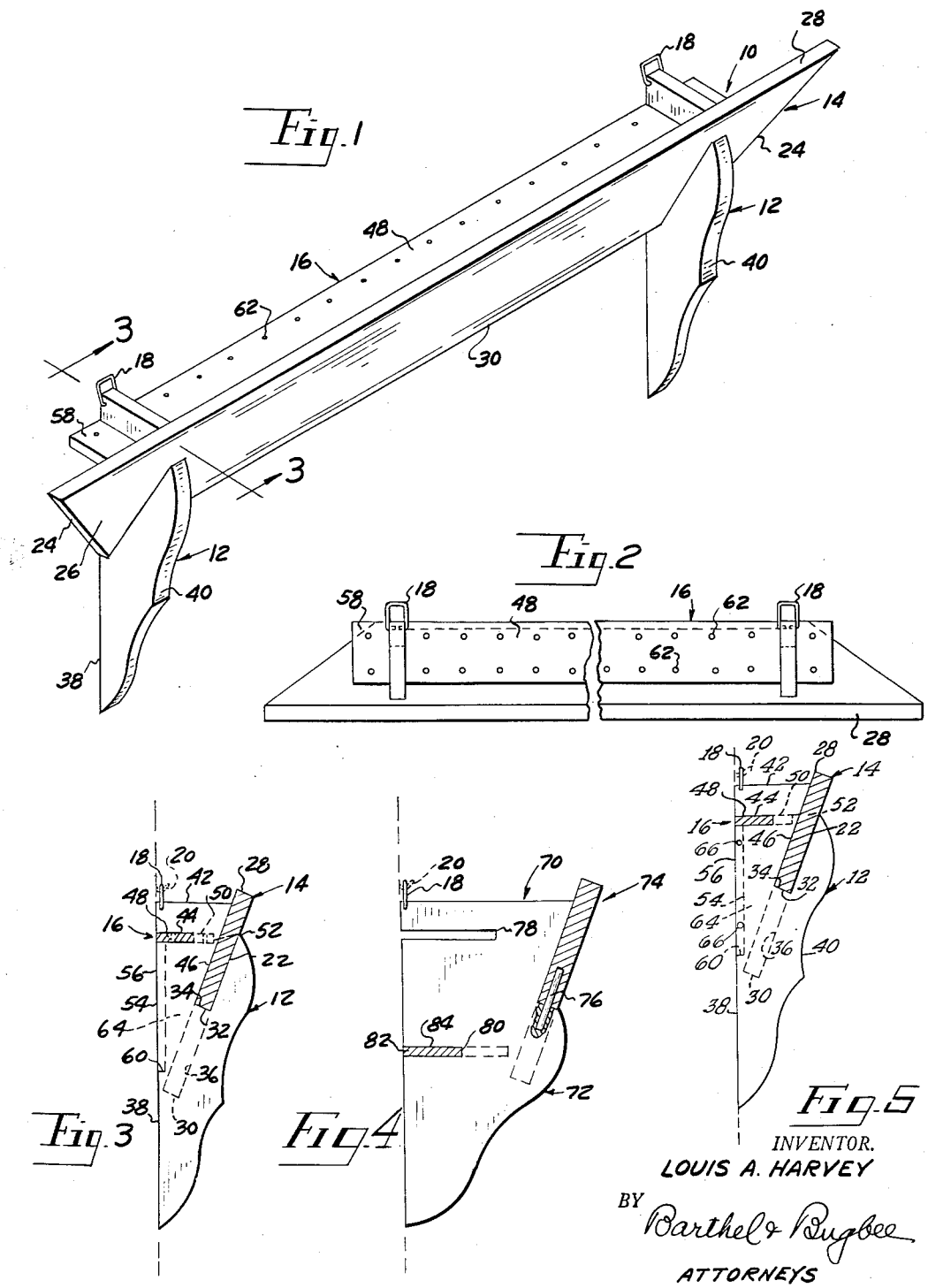
INVENTOR.
LOUIS A. HARVEY
BY Barthel & Bugbee
ATTORNEYS

United States Patent Office 3,118,250
Patented Jan. 21, 1964

3,118,250
FLOWER BOX
Louis A. Harvey, 12977 Riopelle Ave., Detroit 3, Mich.
Filed Nov. 27, 1962, Ser. No. 240,336
10 Claims. (Cl. 47—41)

This invention relates to flower boxes.

One object of this invention is to provide a flower box for interior mounting upon a wall, beneath a window, adjacent a stairway, in a hallway or in other locations for interior decoration, this flower box being constructed so as to be sold and shipped in knocked-down form and quickly and easily assembled by the user without the need for special tools.

Another object is to provide a flower box of the foregoing character wherein the flower box may, at the option of the vendor, be assembled and sold in completed form rather than in knocked-down form.

Another object is to provide a flower box of the foregoing character wherein the front is adapted to be decorated on both sides and interchangeably assembled so as to display either side at the option of the user.

Another object is to provide a flower box of the foregoing character having a perforated shelf for the reception of the stems of flowers and having a compartment beneath the shelf which converges in a downward direction so as to hold the lower ends of the stems in an upright position and to prevent them from falling over.

Another object is to provide a modified flower box of the foregoing character as set forth in the preceding object, wherein the shelf is adapted to be selectively placed upon an upper level for receiving the stems of flowers or upon a lower level for suporting flower containers, such as vases, flower pots or the like.

Other objects and advantages of the invention will become apparent during the course of the following description of the accompanying drawing, wherein:

FIGURE 1 is a top perspective view of a flower box, according to one form of the invention;

FIGURE 2 is a top plan view of the flower box shown in FIGURE 1, with the central portion broken away to conserve space;

FIGURE 3 is a vertical section taken along the line 3—3 in FIGURE 1;

FIGURE 4 is a vertical section similar to FIGURE 3 but through a modification thereof; and FIGURE 5 is a vertical section, similar to FIGURE 3, but through a further modification thereof.

Referring to the drawing in detail, FIGURE 1 shows an interior-mounted flower box, generally designated 10, according to one form of the invention as consisting generally of a pair of laterally-spaced vertically-positioned wall brackets 12 upon which is mounted a front panel 14 and also a combined back and top panel or shelf 16, assembled in the manner described below. Rings 18 mounted on the upper rearward corner of the brackets 12 serve the purpose of mounting the shelf 10 upon a wall such as by fasteners 20 (FIGURES 3 and 4).

The wall brackets 12 are made of any suitable material, such as of wood or plastic boards or sheets and have downwardly-and-rearwardly inclined slots or notches 22 therein (FIGURE 3) extending downward only part of the diagonal width of the shelf 12, half of that width, extending in the direction of the front 14, being found suitable. The slots or notches 22 are spaced inwardly from the opposite ends 24 of the front panel 14 so that the end portions 26 thereof overhang their respective brackets 12 and extend outwardly beyond the latter (FIGURE 1). The ends 24 for ornamental purposes are shown as inclined downwardly so that they converge from the top edge 28 to the bottom edge 30 thereof.

The bottom 32 of each notch 22 (FIGURE 3) is engaged by the bottom 34 of a corresponding notch or slot 36 in the front panel 14, the notch 36 however extending upward from the bottom edge 30 approximately half the width of the panel 14. In this manner, the panel 14 comes to rest with its lower edge 30 located near the rearward and vertical edge 38 of each bracket 12. For ornamental purposes, the front edges 40 of the bracket 12 may also be inclined downwardly and rearwardly toward the lower end of the rear edge 38. Spaced a short distance below the upper edge 42 of each bracket 12 is a horizontal notch or slot 44 (FIGURE 3), the notch 44 also preferably extending approximately halfway through the horizontal width of the bracket 12 between its rearward edge 38 and the rearward surface 46 of the front panel 14.

Fitted into the notches 44 is a correspondingly-notched angle member constituting the combined shelf and back panel 16 of the flower box 10. The angle member 16 has a horizontal top panel or shelf portion 48 provided with notches or slots 50 extending inwardly from the front edge 52 thereof so that when the top portion 48 is fully inserted with its notches 50 interlocking with the notches 44 in the brackets 12, the front edges 52 thereof approximately abuts the rearward surface 46 of the front panel 14 (FIGURE 3) while the back panel portion 54 enters the space between the brackets 12 and fits between them with its rearward surface 56 approximately level or flush with the rear edges 38 of the brackets 12. The angle member 16 is preferably so constructed that the vertical panel portion 54 is shorter than the top panel portion 48, with the result that the latter has horizontal end portions 58 (FIGURES 1 and 2) which extend outwardly beyond the brackets 12 in opposite lateral directions.

The vertical panel portion 54 is constructed of such height that its lower edge 60 approximately abuts the rearward surface 46 of the front panel 14 near the lower edge 30 thereof. The top panel portion 48 is provided with spaced holes 62 therethrough (FIGURES 1 and 2) through which are passed the stems of flowers held by the flower box 10, the stems extending downwardly into the chamber 64 of downwardly-converging triangular cross-section. This construction maintains the stems of the flowers in approximately upright positions and prevents them from falling over. The hole 62 also space the flowers apart from one another in the box 10.

To assemble the flower box from its four disassembled components 12, 14 and 16, the user aligns the downwardly-directed notches 36 of the front panel 14 with the correspondingly upwardly-inclined notches 22 in the brackets 12 and slides them together toward one another into interfitting engagement until the bottom 34 of each notch 36 engages the bottom 32 of each notch 22 (FIGURE 3). The user then aligns the notches 50 in the top panel portion 48 of the angle member 16 with the horizontal upper notches 44 in the brackets 12 and sildes these toward one another into interfitting engagement (FIGURE 3). While this is being done, the vertical back panel portion 54 of the angle member 16, which is slightly shorter than the distance between the top panel portion notches 50, slides into the space between the brackets 12 until its lower edge 60 comes into close proximity to the lower edge 30 of the front panel 14 or actually engages the latter. When this occurs, the rear surface 56 of the back panel portion 54 is approximately flush with the rear edges 38 of the brackets 12. If the respective components 12 and 14 are of wood and the notches thereof accurately made, the frictional contact between these parts holds them together yet permits disassembly, if desired. The angle member 16 is conveniently molded from synthetic plastic material but may optionally be made of wood, in which latter case (FIGURE 5) the top panel portion 48 may be separate from the rear panel portion 54 and the latter secured by fasteners 66, or by adhesives or angle brackets to the brackets 12. The same reference numerals are used in FIGURE 5 to refer to parts corresponding to similar parts in FIGURE 4.

After the four components of the flower box 10 have been assembled in this manner, the latter may be mounted in any convenient location by means of any suitable wall hangers, fasteners, picture wire or the like attached to the eyes 18 in any desired location. The flower box 10 may then be filled with artificial flowers, passing their stems through the holes 62 in the top panel portion 48 downwardly into the converging chamber 64 (FIGURE 3).

The modified flower box, generally designated 70, shown in FIGURE 4 is of generally similar construction to the flower box 10 of FIGURE 1, and, like it, consists of a pair of inclinedly-notched brackets 72 (only one being shown) receiving a correspondingly-notched inclined front panel 74 in similar interfitting engagement, dowel pins 76 being optionally used to facilitate assembly and strengthen the construction. The brackets 72, unlike the brackets 12 of the window box 10, are provided with parallel upper and lower notches 78 and 80 respectively, each being adapted to receive a perforated shelf 82 which is notched as at 84 similarly to the top panel portion 48 of the angle member 16 of FIGURES 1 to 3 inclusive, so as to slide into either of the notches 78 or 80 and interfit with them. The upper notch 78 is used to receive the notched shelf 82 when cut flowers are to be placed in the flower box 70 with their stems inserted through the holes or perforations corresponding to the holes 62 of FIGURES 1 and 2. The shelf 82 is slid into the lower notches 80 with its notches 84 interfitting with the notches 80 when it is desired to put potted plants into the flower box 70. In this instance, the bottoms of the flower pots rest upon the shelf 82 and the flower pots themselves are concealed by the front panel 74.

The assembly of the flower box 70 follows the same procedure set forth above in the assembly of the flower box 10, and hence does not require repetition.

What I claim is:
1. A flower box, comprising
    a pair of laterally-spaced vertically-positioned brackets having downwardly and rearwardly inclined notches in the upper forward portions thereof,
    a downwardly and rearwardly inclined front panel having in its lower portion a pair of laterally-spaced upwardly-extending notches disposed in interfitting engagement with the inclined bracket notches,
    said brackets in their upper rearward portions having forwardly-extending approximately horizontal notches,
    and an approximately horizontal shelf panel having in its forward portion a pair of laterally-spaced rearwardly-extending notches disposed in interfitting engagement with the approximately horizontal notches of said brackets.
2. A flower box, according to claim 1, wherein said shelf panel is provided with a multiplicity of spaced flower stem holes extending therethrough.
3. A flower box, according to claim 1, wherein flower box suspension elements are secured to said brackets.
4. A flower box, according to claim 3, wherein said suspension elements are secured to the upper rearward portions of said brackets.
5. A flower box, according to claim 1, wherein a back panel is disposed adjacent the rearward edges of said brackets.
6. A flower box, according to claim 5, wherein said back panel is disposed in an approximately vertical position and forms with said front panel and said brackets a downwardly-converging chamber.
7. A flower box, according to claim 1, wherein a back panel is secured to said top panel and extends downwardly therefrom adjacent the rearward edges of said brackets.
8. A flower box, according to claim 7, wherein said back panel is integral with said top panel.
9. A flower box, according to claim 7, wherein said back panel has a length slightly less than the distance between said brackets and is mounted in the space between said brackets.
10. A flower box, according to claim 1, wherein said brackets are provided in their lower rearward portions with additional forwardly-extending approximately horizontal supplemental notches, and wherein said shelf panel is selectively and interchangeably disposable in interfitting engagement with either the upper or lower bracket notches thereby provided.

References Cited in the file of this patent
UNITED STATES PATENTS

| 391,013 | Bogardus | Oct. 16, 1888 |
| 2,878,618 | Trombetta | Mar. 24, 1959 |

FOREIGN PATENTS

| 21,796 | Great Britain | Oct. 17, 1898 |